United States Patent
Saito et al.

(10) Patent No.: US 12,013,650 B2
(45) Date of Patent: Jun. 18, 2024

(54) CHARGING ROLL FOR ELECTROPHOTOGRAPHIC APPARATUS

(71) Applicant: Sumitomo Riko Company Limited, Aichi (JP)

(72) Inventors: Yoshihiro Saito, Aichi (JP); Hiroshi Ukai, Aichi (JP); Masanori Ishida, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 0 days.

(21) Appl. No.: 18/330,337

(22) Filed: Jun. 6, 2023

(65) Prior Publication Data

US 2023/0314980 A1    Oct. 5, 2023

Related U.S. Application Data

(63) Continuation of application No. PCT/JP2022/005776, filed on Feb. 15, 2022.

(30) Foreign Application Priority Data

Feb. 19, 2021  (JP) .................................. 2021-025091

(51) Int. Cl.
*G03G 15/02* (2006.01)

(52) U.S. Cl.
CPC ................................ *G03G 15/0233* (2013.01)

(58) Field of Classification Search
CPC .................. G03G 15/0233; B65H 2404/13162
USPC ...................................... 399/176; 492/18, 35
See application file for complete search history.

(56) References Cited

U.S. PATENT DOCUMENTS

| | | | | |
|---|---|---|---|---|
| 6,096,395 A | * | 8/2000 | Hayashi | ................... F16C 13/00 399/176 |
| 7,965,965 B2 | * | 6/2011 | Maeda | ............... G03G 15/0818 399/119 |
| 2011/0002711 A1 | * | 1/2011 | Wada | ................... G03G 15/0233 399/176 |
| 2018/0275553 A1 | * | 9/2018 | Iwasaki | .............. G03G 21/1814 |

(Continued)

FOREIGN PATENT DOCUMENTS

| | | | | |
|---|---|---|---|---|
| JP | 2018077470 A | * | 5/2018 | ......... G03G 15/0233 |
| WO | 2018025870 | | 2/2018 | |

OTHER PUBLICATIONS

"International Search Report (Form PCT/ISA/210) of PCT/JP2022/005776", mailed on Apr. 5, 2022, with English translation thereof, pp. 1-4.

*Primary Examiner* — Robert B Beatty
(74) *Attorney, Agent, or Firm* — JCIPRNET

(57) ABSTRACT

In a charging roll, grooves regularly defining spirals are formed on an elastic body layer, with a groove width of 4 μm to 280 μm and a groove depth of 2 μm to 30 μm. On an outer peripheral surface of the elastic body layer, an area ratio between an area of a bottom surface of the groove and an area of a plane part is 0.3 to 2.4. The surface layer includes a binder polymer and a roughness forming particle. The roughness forming particle is arranged on the plane part and the groove. A surface roughness of the surface layer on the groove is 2 μm to 16 μm. A surface roughness of the entire surface layer is 5 μm to 26 μm. A thickness of the binder polymer covering the roughness forming particle on the groove is greater than that on the plane part.

8 Claims, 2 Drawing Sheets

(56) References Cited

U.S. PATENT DOCUMENTS

2019/0025727 A1 1/2019 Oura et al.
2021/0116856 A1* 4/2021 Mukai .................. G03G 5/0553

* cited by examiner (a)

(b)

CHARGING ROLL FOR ELECTROPHOTOGRAPHIC APPARATUS

CROSS-REFERENCE TO RELATED APPLICATION

The present application is a continuation of PCT/JP2022/005776, filed on Feb. 15, 2022, and is related to and claims priority from Japanese patent application no. 2021-025091, filed on Feb. 19, 2021. The entire contents of the aforementioned applications are hereby incorporated by reference herein.

BACKGROUND

Technical Field

The disclosure relates to a charging roll for an electrographic apparatus, which is used in an electrographic apparatus such as a copier, a printer, a facsimile, etc. that adopts an electrographic system.

Related Art

Conventionally, a charging roll for an electrophotographic apparatus includes an elastic body layer having rubber elasticity on an outer peripheral surface of a shaft such as a core bar, and includes a surface layer on an outer peripheral surface of the elastic body layer. In addition, in the charging roll, roughness forming particles may be added to a binder polymer of the surface layer, for example, considering the charge properties (see, for example, International Publication No. 2018/025870).

However, since the roughness forming particles added to the surface layer are likely to aggregate, the uniformity in surface roughness is likely to deteriorate in a roughness forming method involving adding roughness forming particles. In particular, if two or more types of roughness forming particles having different particle diameters are used to form surface asperities, the particles having different particle diameters aggregate, so the uniformity in surface roughness is particularly likely to deteriorate. If the uniformity in surface roughness deteriorates, the uniformity in discharge properties of the charging roll may deteriorate.

SUMMARY

A charging roll for an electrophotographic apparatus according to an embodiment of the disclosure includes a shaft, an elastic body layer formed on an outer peripheral surface of the shaft, and a surface layer formed on an outer peripheral surface of the elastic body layer. Grooves which regularly define spirals along an axial direction are formed on the outer peripheral surface of the elastic body layer. A groove width of the groove is 4 μm or more and 280 μm or less. A groove depth of the groove is 2 μm or more and 30 μm or less. On the outer peripheral surface of the elastic body layer, an area ratio a/b between an area a of a bottom surface of the groove and an area b of a plane part, which is a portion other than the groove, is 0.3 or more and 2.4 or less. The surface layer includes a binder polymer and a roughness forming particle. The roughness forming particle is arranged on the plane part and on the groove of the elastic body layer, respectively. A surface roughness Rz of the surface layer in a region on the groove is 2 μm or more and 16 μm or less. A surface roughness Rz of the entire surface layer is 5 μm or more and 26 μm or less. A thickness of the binder polymer covering the roughness forming particle on the groove is greater than a thickness of the binder polymer covering the roughness forming particle on the plane part.

In some embodiments, the roughness forming particle may be composed of one type of particles. A material of the roughness forming particle may include at least one of polyurethane, polyamide, and acrylic resin. An average particle diameter of the roughness forming particle may be 3 μm or more and 32 μm or less. A difference between the thickness of the binder polymer covering the roughness forming particle on the plane part and the thickness of the binder polymer covering the roughness forming particle on the groove may be 4 μm or more and 16 μm or less. The elastic body layer may include at least one of isoprene rubber, nitrile rubber, and hydrin rubber. The binder polymer of the surface layer may include at least one of polyurethane and polyamide. The grooves in a mesh pattern in which grooves that regularly define right-handed spirals along the axial direction and grooves that regularly define left-handed spirals along the axial direction intersect with each other may be formed on the outer peripheral surface of the elastic body layer.

The charging roll for an electrophotographic apparatus according to an embodiment of the disclosure includes a shaft, an elastic body layer formed on an outer peripheral surface of the shaft, and a surface layer formed on an outer peripheral surface of the elastic body layer. Grooves which regularly define spirals along an axial direction are formed on the outer peripheral surface of the elastic body layer. A groove width of the groove is 4 μm or more and 280 μm or less. A groove depth of the groove is 2 μm or more and 30 μm or less. On the outer peripheral surface of the elastic body layer, an area ratio a/b between an area a of a bottom surface of the groove and an area b of a plane part, which is a portion other than the groove, is 0.3 or more and 2.4 or less. The surface layer includes a binder polymer and a roughness forming particle. The roughness forming particle is arranged on the plane part and on the groove of the elastic body layer, respectively. A surface roughness Rz of the surface layer in a region on the groove is 2 μm or more and 16 μm or less. A surface roughness Rz of the entire surface layer is 5 μm or more and 26 μm or less. A thickness of the binder polymer covering the roughness forming particle on the groove is greater than a thickness of the binder polymer covering the roughness forming particle on the plane part. Thus, uniformity in discharge properties is excellent.

If the roughness forming particle is composed of one type of particles, since the asperity configuration of the elastic body layer is easily reflected in the surface asperities of the charging roll, it is easy to control the surface asperities of the charging roll. Further, since aggregation of the roughness forming particles can be easily controlled, uniformity in surface roughness can be improved. Furthermore, since it is easy to adjust the thickness of the binder polymer covering the roughness forming particle, uniformity in discharge properties can be improved.

If the material of the roughness forming particle includes at least one of polyurethane, polyamide, and acrylic resin, since the roughness forming particle is composed of a material having a high dielectric constant, charging properties of the roll surface are improved.

If the average particle diameter of the roughness forming particle is 3 μm or more and 32 μm or less, suitable asperities are easily formed. Thus, uniformity in discharge properties can be improved.

If the difference between the thickness of the binder polymer covering the roughness forming particle on the plane part and the thickness of the binder polymer covering the roughness forming particle on the groove is 4 μm or more, the charge amount on the surface of the binder polymer covering the roughness forming particle on the plane part becomes relatively large, and a range of environment in which a black dot image is not generated is widened. Further, if the difference in thickness is 16 μm or less, since the thickness is maintained at an appropriate level, suitable asperities are easily formed. Thus, uniformity in discharge properties can be improved.

If the elastic body layer includes at least one of isoprene rubber, nitrile rubber, and hydrin rubber, the compression set is small, and generation of a stripe image corresponding to a deformed part upon setting the charging roll is suppressed.

If the binder polymer of the surface layer includes at least one of polyurethane and polyamide, since the binder polymer is composed of a material with a high dielectric constant, charging properties of the roll surface are improved. In addition, the compression set is small, and generation of a stripe image corresponding to a deformed part upon setting the charging roll is suppressed.

If grooves in a mesh pattern in which grooves that regularly define right-handed spirals along the axial direction and grooves that regularly define left-handed spirals along the axial direction intersect with each other are formed on the outer peripheral surface of the elastic body layer, uniformity in surface roughness is improved. Thus, uniformity in discharge properties can be improved.

BRIEF DESCRIPTION OF THE DRAWINGS (a) of FIG. 1 is a schematic external view of a charging roll for an electrophotographic apparatus according to an embodiment of the disclosure, and (b) of FIG. 1 is a cross-sectional view of the charging roll for an electrophotographic apparatus taken along line A-A.

DESCRIPTION OF THE EMBODIMENTS

An embodiment of the disclosure provides a charging roll for an electrophotographic apparatus which is excellent in uniformity in discharge properties.

Figure 1:
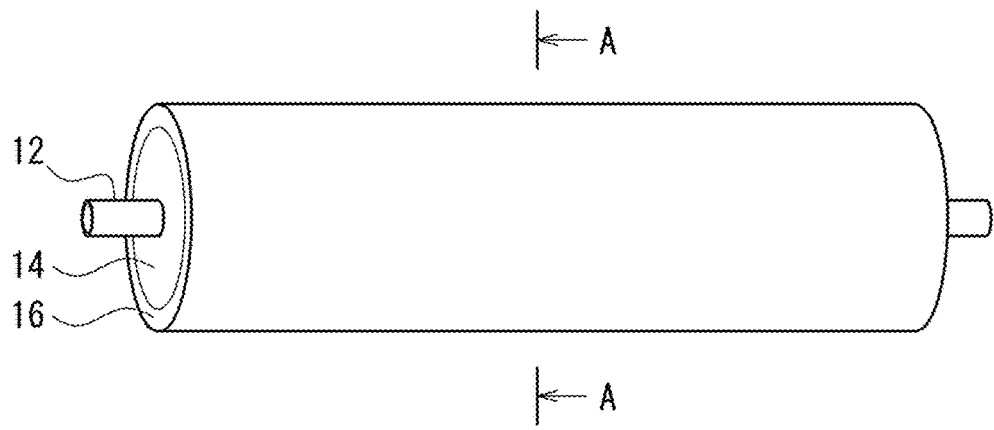
Figure 1:
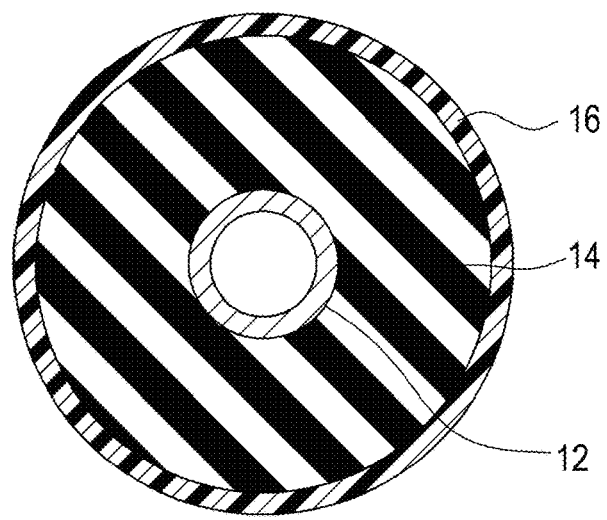
Figure 2:
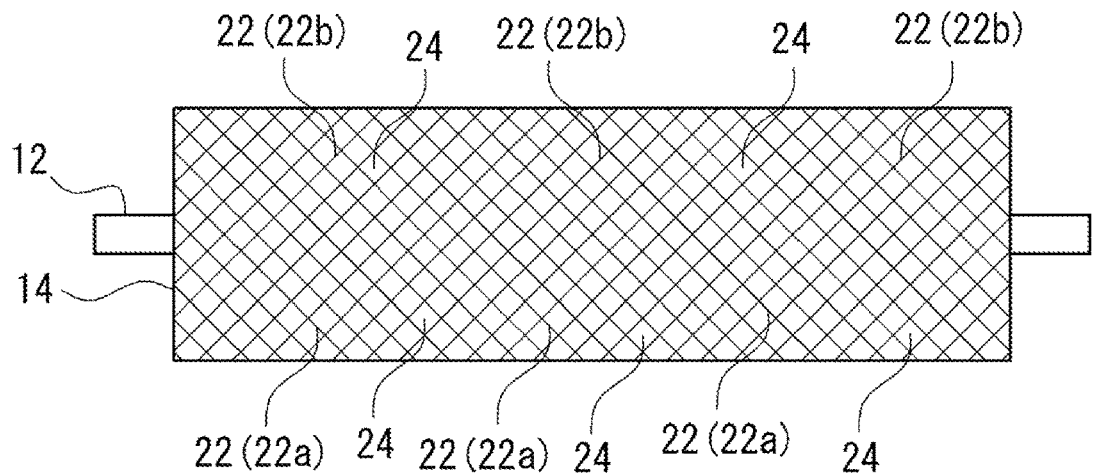
FIG. 2 is a schematic external view of an elastic body layer showing a pattern of grooves formed on an outer peripheral surface of the elastic body layer.
Figure 3:
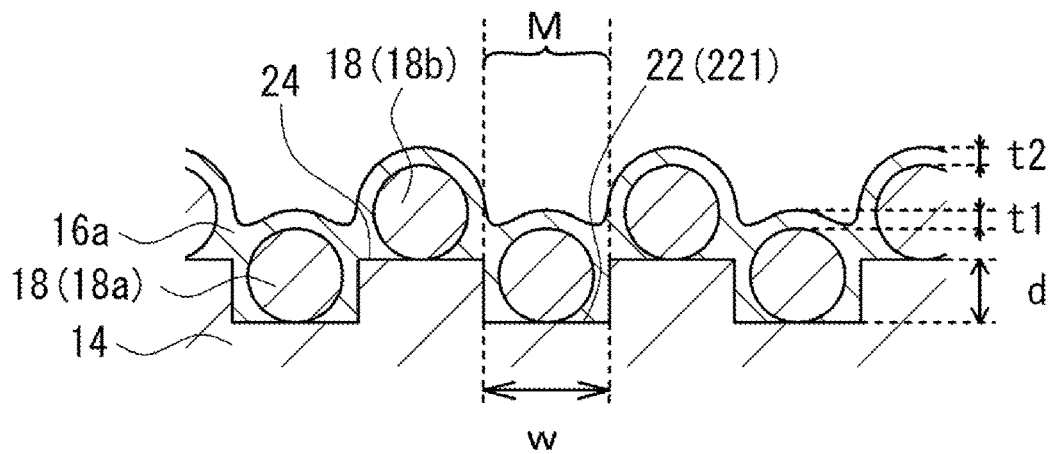
FIG. 3 is an enlarged cross-sectional view of a surface layer.

A charging roll for an electrophotographic apparatus (hereinafter sometimes simply referred to as a charging roll) according to the disclosure will be described in detail. (a) of FIG. 1 is a schematic external view of a charging roll for an electrophotographic apparatus according to an embodiment of the disclosure, and (b) of FIG. 1 is a cross-sectional view of the charging roll for an electrophotographic apparatus taken along line A-A. FIG. 2 is a schematic external view of an elastic body layer showing a pattern of grooves formed on an outer peripheral surface of the elastic body layer. FIG. 3 is an enlarged cross-sectional view of a surface layer.

A charging roll 10 includes a shaft 12, an elastic body layer 14 formed on an outer peripheral surface of the shaft 12, and a surface layer 16 formed on an outer peripheral surface of the elastic body layer 14. The elastic body layer 14 is a layer (base layer) that serves as a base of the charging roll 10. The surface layer 16 is a layer that is present on a surface of the charging roll 10. Although not shown, an intermediate layer such as a resistance adjusting layer may be formed between the elastic body layer 14 and the surface layer 16 as required.

The shaft 12 is not particularly limited as long as it has conductivity. To be specific, a core bar or the like composed of a solid body or a hollow body made of a metal such as iron, stainless steel, or aluminum may be given as an example. An adhesive, a primer, etc. may be applied to a surface of the shaft 12 as required. That is, the elastic body layer 14 may be bonded to the shaft 12 via an adhesive layer (primer layer). The adhesive, the primer, etc. may be made electrically conductive as required.

As shown in FIG. 2, grooves 22 that regularly define spirals along the axial direction are formed on the outer peripheral surface of the elastic body layer 14. More specifically, the grooves 22 in a mesh pattern in which grooves 22a that regularly define right-handed spirals along the axial direction and grooves 22b that regularly define left-handed spirals along the axial direction intersect with each other are formed on the outer peripheral surface of the elastic body layer 14. The expression "regularly" means that the grooves 22 are formed at regular intervals in the axial direction. A portion of the outer peripheral surface of the elastic body layer 14 other than the grooves 22 defines a plane part 24. As shown in FIG. 3, the plane part 24 protrudes radially outward beyond a bottom surface 221 of the groove 22. With the bottom surface 221 of the groove 22 arranged relatively radially inward and the plane part 24 arranged relatively radially outward, the elastic body layer 14 is formed with surface asperities on the outer peripheral surface. Since the grooves 22 are formed to regularly define spirals along the axial direction, the outer peripheral surface of the elastic body layer 14 is formed with uniform surface asperities. In addition, since the grooves 22 are formed in a mesh pattern in which the grooves 22a that define right-handed spirals and the grooves 22b that define left-handed spirals regularly along the axial direction intersect with each other, compared to grooves that are not in a mesh pattern, the outer peripheral surface of the elastic body layer 14 is formed with more uniform surface asperities.

A groove width w of the groove 22 is 4 μm or more and 280 μm or less. A groove depth d of the groove 22 is 2 μm or more and 30 μm or less. On the outer peripheral surface of the elastic body layer 14, an area ratio a/b between an area a of the bottom surface 221 of the groove 22 and an area b of the plane part 24 is 0.3 or more and 2.4 or less.

If the groove width w of the groove 22 is less than 4 μm, the groove width w becomes too small and a roughness forming particle 18 cannot enter the groove 22. Thus, a difference between a surface roughness Rz defined by a roughness forming particle 18b on the plane part 24 and a surface roughness Rz defined by a roughness forming particle 18a on the groove 22 becomes small, and horizontal stripes are generated due to insufficient charging. If a roughness forming particle 18 having a size that fits in the small groove width w is used, a roughness that ensures sufficient discharge cannot be formed. Considering the above, the groove width w of the groove 22 may be 5 μm or more, 10 μm or more, 20 μm or more, 30 μm or more, 40 μm or more, 50 μm or more, etc. according to the size of the average particle diameter of the roughness forming particle 18 to be used.

If the groove width w of the groove 22 exceeds 280 μm, the groove width w becomes too large, and the roughness forming particle 18 cannot be arranged uniformly in the groove 22. If a roughness forming particle 18 having a size that is suitable for the large groove width w is used, a protrusion defined by the roughness forming particle 18 becomes too large, the surface roughness becomes too large, and an appropriate surface roughness cannot be obtained. Thus, uniform discharge properties cannot be obtained. Further, if the groove width w is too large, a binder polymer 16a covering the roughness forming particle 18 on the groove 22 is likely to come into contact with a photoconductor, and wearing occurs not only in the binder polymer 16a covering the roughness forming particle 18b on the plane part 24 and the roughness forming particle 18b thereunder, but wearing also occurs in the binder polymer 16a covering the roughness forming particle 18a on the groove 22 and the roughness forming particle 18a thereunder. Thus, the entire surface of the surface layer 16 is worn upon running over a long period of time, and unevenness occurs in an image. Considering the above, the groove width w of the groove 22 may be 250 µm or less, 200 µm or less, 150 µm or less, 100 µm or less, etc. according to the size of the average particle diameter of the roughness forming particle 18 to be used.

If the groove depth d of the groove 22 is less than 2 µm, the groove depth d becomes too small, the difference between the surface roughness Rz defined by the roughness forming particle 18b on the plane part 24 and the surface roughness Rz defined by the roughness forming particle 18a on the groove 22 becomes too small, and horizontal stripes are generated due to insufficient charging. If a small roughness forming particle 18 is used in accordance with the small groove depth d, a roughness that ensures sufficient discharge cannot be formed. Considering the above, the groove depth d of the groove 22 may be 3 µm or more, 5 µm or more, 10 µm or more, etc. according to the size of the average particle diameter of the roughness forming particle 18 to be used.

If the groove depth d of the groove 22 exceeds 30 µm, the groove depth d becomes too large, and a surface roughness cannot be formed on the groove 22 by the roughness forming particle 18 arranged in the groove 22. Thus, black dots (fogging) are generated in the image after running over a long period of time. If a large roughness forming particle 18 is used in accordance with the large groove depth d, the difference between the surface roughness Rz defined by the roughness forming particle 18b on the plane part 24 and the surface roughness Rz defined by the roughness forming particle 18a on the groove 22 becomes too large, and discharge becomes difficult. Considering the above, the groove depth d of the groove 22 may be 25 µm or less, 20 µm or less, etc. according to the size of the average particle diameter of the roughness forming particle 18 to be used.

If the area ratio a/b between the area a of the bottom surface 221 of the groove 22 and the area b of the plane part 24 is less than 0.3 or exceeds 2.4, the balance between the area a of the bottom surface 221 and the area b of the plane part 24 becomes poor, and uniformity in the surface asperities is deteriorated. Thus, an uneven image is likely to be generated after running over a long period of time. Further, if the balance between the area a of the bottom surface 221 and the area b of the plane part 24 is poor, adhesion between the elastic body layer 14 and the surface layer 16 is reduced. Considering the above, the area ratio a/b may be 0.5 or more, 0.7 or more, etc. Also, the area ratio a/b may be 2.0 or less, 1.8 or less, 1.5 or less, etc.

The groove width w of the groove 22 is calculated based on a mean of groove widths w at 100 points of the grooves 22 observed in photographed images obtained by photographing the outer peripheral surface of the elastic body layer 14 with a laser microscope. The groove depth d of the groove 22 is calculated based on a mean of groove depths d at 100 points of the grooves 22 observed in photographed images obtained by photographing a radial cross section of the elastic body layer 14 with a laser microscope. The area ratio a/b between the area a of the bottom surface 221 of the groove 22 and the area b of the plane part 24 is obtained by photographing any five positions of the outer peripheral surface of the elastic body layer 14 with a laser microscope, respectively calculating the area a of the bottom surface 221 of the groove 22 and the area b of the plane part 24 observed in a predetermined range (0.1 mm×0.1 mm) of the photographed images, and calculating a mean of the ratios.

The elastic body layer 14 contains a crosslinked rubber. The elastic body layer 14 is formed of a conductive rubber composition containing an uncrosslinked rubber. The crosslinked rubber is obtained by crosslinking the uncrosslinked rubber. The uncrosslinked rubber may be a polar rubber or a non-polar rubber.

The polar rubber is a rubber having a polar group. Examples of the polar group may include a chloro group, a nitrile group, a carboxyl group, an epoxy group, etc. To be specific, examples of the polar rubber may include a hydrin rubber, a nitrile rubber (NBR), a urethane rubber (U), an acrylic rubber (copolymer of an acrylic acid ester and 2-chloroethyl vinyl ether, ACM), a chloroprene rubber (CR), an epoxidized natural rubber (ENR), etc. Among the polar rubbers, the hydrin rubber and the nitrile rubber (NBR) may be adopted, considering that the volume resistivity tends to be especially low.

Examples of the hydrin rubber may include an epichlorohydrin homopolymer (CO), an epichlorohydrin-ethylene oxide binary copolymer (ECO), an epichlorohydrin-allyl glycidyl ether binary copolymer (GCO), an epichlorohydrin-ethylene oxide-allyl glycidyl ether ternary copolymer (GECO), etc.

Examples of the urethane rubber may include a polyether-type urethane rubber having an ether bond in a molecule. The polyether-type urethane rubber may be produced by a reaction of diisocyanate and polyether having a hydroxyl group at both terminals. The polyether is not particularly limited, and examples thereof may include polyethylene glycol, polypropylene glycol, etc. The diisocyanate is not particularly limited, and examples thereof may include tolylene diisocyanate, diphenylmethane diisocyanate, etc.

Examples of the non-polar rubber may include silicone rubber (Q), isoprene rubber (IR), natural rubber (NR), styrene-butadiene rubber (SBR), butadiene rubber (BR) etc. Among the non-polar rubbers, silicone rubber may be adopted considering low hardness and resistance to settling (excellent elastic recovery).

The elastic body layer 14 may contain at least one of isoprene rubber, nitrile rubber, and hydrin rubber. If the elastic body layer 14 contains at least one of isoprene rubber, nitrile rubber, and hydrin rubber, the compression set is small, and generation of a stripe image corresponding to a deformed part upon setting the charging roll 10 is suppressed.

Examples of a crosslinking agent may include a sulfur crosslinking agent, a peroxide crosslinking agent, and a dechlorination crosslinking agent. These crosslinking agents may be used alone or as a combination of two or more crosslinking agents.

Examples of the sulfur crosslinking agent may include conventionally known sulfur crosslinking agents, such as powdered sulfur, precipitated sulfur, colloidal sulfur, surface-treated sulfur, insoluble sulfur, sulfur chloride, a thiuram vulcanization accelerator, high molecular polysulfide, etc.

Examples of the peroxide crosslinking agent may include conventionally known peroxide crosslinking agents, such as peroxy ketals, dialkyl peroxides, peroxy esters, ketone peroxides, peroxydicarbonate, diacyl peroxide, hydroperoxide, etc.

Examples of the dechlorination crosslinking agent may include a dithiocarbonate compound. To be more specific, examples of the dechlorination crosslinking agent may include quinoxaline-2,3-dithiocarbonate, 6-methylquinoxaline-2,3-dithiocarbonate, 6-isopropylquinoxaline-2,3-dithiocarbonate, 5,8-dimethylquinoxaline-2,3-dithiocarbonate, etc.

To prevent bleeding or the like, a formulated amount of the crosslinking agent may be within a range of 0.1 to 2 parts by mass, within a range of 0.3 to 1.8 parts by mass, or more preferably in some embodiments, for example, within a range of 0.5 to 1.5 parts by mass, with respect to 100 parts by mass of an uncrosslinked rubber.

In the case where the dechlorination crosslinking agent is used as the crosslinking agent, a dechlorination crosslinking accelerator may be used in combination therewith. Examples of the dechlorination crosslinking accelerator may include 1,8-diazabicyclo(5,4,0)undecene-7 (hereinafter abbreviated as DBU) or weak acid salts thereof. The dechlorination crosslinking accelerator may be used in the form of the DBU, but may also be used in the form of the weak acid salt thereof in view of treatment. Examples of the weak acid salts of the DBU may include carbonate, stearate, 2-ethylhexylate, benzoate, salicylate, 3-hydroxy-2-naphthoate, a phenol resin salt, a 2-mercaptobenzothiazole salt, a 2-mercaptobenzimidazole salt, etc.

To prevent bleeding or the like, a content of the dechlorination crosslinking accelerator may be within a range of 0.1 to 2 parts by mass, within a range of 0.3 to 1.8 parts by mass, or more preferably in some embodiments, for example, within a range of 0.5 to 1.5 parts by mass, with respect to 100 parts by mass of the uncrosslinked rubber.

A conductive agent may be added to the elastic body layer 14 to impart conductivity. Examples of the conductive agent may include an electronic conductive agent and an ionic conductive agent. Examples of the electronic conductive agent may include carbon black, graphite, and conductive metal oxide. Examples of the conductive metal oxide may include conductive titanium oxide, conductive zinc oxide, conductive tin oxide, etc. Examples of the ionic conductive agent may include quaternary ammonium salt, borate, a surfactant, etc. Various additives may be appropriately added to the elastic body layer 14 as required. Examples of the additives may include a lubricant, a vulcanization accelerator, an anti-aging agent, a light stabilizer, a viscosity modifier, a processing aid, a flame retardant, a plasticizer, a foaming agent, a filler, a dispersant, a defoamer, a pigment, a mold release agent, etc.

The elastic body layer 14 may be adjusted to a predetermined volume resistivity according to the type of the crosslinked rubber, the added amount of the ionic conductive agent, the addition of the electronic conductive agent, etc. The volume resistivity of the elastic body layer 14 may be appropriately set to a range of $10^2$ to $10^{10}$ Ω·cm, $10^3$ to $10^9$ Ω·cm, $10^4$ to $10^8$ Ω·cm, etc. depending on an application or the like.

A thickness of the elastic body layer 14 is not particularly limited, and may be appropriately set within a range of 0.1 to 10 mm, depending on an application or the like.

The surface layer 16 includes a binder polymer 16a and a roughness forming particle 18.

The binder polymer 16a is a base polymer that forms the surface layer 16. Examples of the binder polymer 16a may include urethane resin, polyamide resin, acrylic resin, acrylic silicone resin, butyral resin (PVB), alkyd resin, polyester resin, fluororubber, fluororesin, a mixture of fluororubber and fluororesin, silicone resin, silicone-grafted acrylic polymer, acrylic-grafted silicone polymer, nitrile rubber, urethane rubber, etc.

The binder polymer 16a may include at least one of polyurethane and polyamide. If the binder polymer 16a of the surface layer 16 includes at least one of polyurethane and polyamide, since the binder polymer 16a is composed of a material with a high dielectric constant, charging properties of the roll surface are improved. In addition, the compression set is small, and generation of a stripe image corresponding to a deformed part upon setting the charging roll 10 is suppressed. The polyurethane includes urethane resin, urethane rubber, and urethane elastomer. The polyamide may be modified. Examples of the modified polyamide may include alkoxylated polyamides such as N-methoxymethylated nylon.

The roughness forming particle 18 is particle for imparting roughness to the surface of the surface layer 16. That is, it is a particle for imparting asperities to the surface of the surface layer 16. As shown in FIG. 3, the roughness forming particles 18 are respectively arranged on the plane part 24 and the groove 22 of the elastic body layer 14. With the step difference between the plane part 24 of the elastic body layer 14 and the bottom surface 221 of the groove 22, the roughness forming particle 18b on the plane part 24 (roughness forming particle 18b arranged on the plane part 24) and the roughness forming particle 18a on the groove 22 (roughness forming particle 18a arranged on the groove 22) exhibit different degrees of protrusion toward the radially outer side even though the particle diameter is the same. With the step difference between the plane part 24 of the elastic body layer 14 and the bottom surface 221 of the groove 22, the roughness forming particle 18b on the plane part 24 protrudes radially outward beyond the roughness forming particle 18a on the groove 22.

The protrusion defined by the roughness forming particle 18b on the plane part 24, which protrudes more radially outward, forms a portion that comes into contact with the photoconductor, and the protrusion defined by the roughness forming particle 18a on the groove 22, which is positioned more radially inward, forms a portion that does not come into contact with the photoconductor. The protrusion defined by the roughness forming particle 18a on the groove 22 serves as a discharge start point. Since the surface layer 16 includes the roughness forming particle 18b on the plane part 24, an appropriate discharge space is ensured between the photoconductor and the charging roll 10. In addition, since the surface layer 16 includes the roughness forming particle 18a on the groove 22, the discharge start point is ensured. Thus, the surface asperities of the surface layer 16 increase the discharge space between the photoconductor and the charging roll 10 and promotes discharge. As a result, it is possible to improve charging properties and suppress image defects such as horizontal stripes and unevenness. In the charging roll 10 according to the disclosure, with a step difference provided between the plane part 24 of the elastic body layer 14 and the bottom surface 221 of the groove 22, an appropriate discharge space and a discharge start point can be easily formed between the photoconductor and the charging roll 10, even though the roughness forming particles 18 contained in the surface layer 16 have the same particle diameter.

The surface roughness Rz of the surface layer 16 in a region M on the groove 22 is set to 2 μm or more and 16 μm or less. Moreover, the surface roughness Rz of the entire surface layer 16 is set to 5 μm or more and 26 μm or less. Thus, an appropriate discharge space and a discharge start point can be formed between the photoconductor and the charging roll 10.

If the surface roughness Rz of the surface layer 16 in the region M on the groove 22 is less than 2 μm, the surface roughness Rz becomes too small, the discharge start point is insufficient, and discharge becomes insufficient, so black dots (fogging) cannot be suppressed in the image after running over a long period of time. Considering the above, the surface roughness Rz may be 3 μm or more, or more preferably in some embodiments, for example, 5 μm or more. On the other hand, if the surface roughness Rz of the surface layer 16 in the region M on the groove 22 exceeds 16 μm, the surface roughness Rz of the entire surface layer 16 becomes too large and discharge becomes difficult, so black dots (fogging) cannot be suppressed in the image after running over a long period of time. Considering the above, the surface roughness Rz may be 15 μm or less, or more preferably in some embodiments, for example, 12 μm or less.

If the surface roughness Rz of the entire surface layer 16 is less than 5 μm, the surface roughness Rz becomes too small, the discharge start point is insufficient, and discharge becomes insufficient, so black dots (fogging) cannot be suppressed in the image after running over a long period of time. Considering the above, the surface roughness Rz may be 7 μm or more, or more preferably in some embodiments, for example, 10 μm or more. On the other hand, if the surface roughness Rz of the entire surface layer 16 exceeds 26 μm, the surface roughness Rz becomes too large and discharge becomes difficult, so black dots (fogging) cannot be suppressed in the image after running over a long period of time. Considering the above, the surface roughness Rz may be 25 μm or less, or more preferably in some embodiments, for example, 20 μm or less.

The surface roughness Rz is a 10-point mean roughness, and is a mean value of values measured at any five positions in accordance with JIS B0601 (1994). The surface roughness Rz of the entire surface layer 16 may be measured based on observation using a laser microscope (e.g., "VK-9510" manufactured by Keyence). In images photographed at 400 times magnification, a value calculated in a surface roughness mode of the analysis program (program name: KEYENCE VK Analyzer analysis application) may be taken as the surface roughness Rz of the entire surface layer 16. The surface roughness Rz of the surface layer 16 in the region on the groove 22 may be measured based on observation using a laser microscope (e.g., "VK-9510" manufactured by Keyence). In the photographed images, a value calculated by selecting a groove of 0.01 mm² in a surface roughness mode of the analysis program (program name: KEYENCE VK Analyzer analysis application) may be taken as the surface roughness Rz of the surface layer 16 in the region on the groove 22.

The surface roughness Rz of the surface layer 16 may be adjusted by adjusting the groove width w of the groove 22, the groove depth d, the area ratio a/b between the bottom surface 221 of the groove 22 and the plane part 24, the particle diameter of the roughness forming particle 18, the thickness of the binder polymer 16a, etc.

A particle such as a resin particle and an inorganic particle may be used as the roughness forming particle 18 added to the surface layer 16 of the charging roll. The material of the roughness forming particle 18 is not particularly limited. The material of the roughness forming particle 18 may include at least one of polyurethane, polyamide, and acrylic resin. If the material of the roughness forming particle 18 includes at least one of polyurethane, polyamide, and acrylic resin, since the roughness forming particle 18 is composed of a material having a high dielectric constant, charging properties of the roll surface are improved.

Although the size of the roughness forming particle 18 is not particularly limited, the average particle diameter may be 3 μm or more and 32 μm or less to form suitable asperities and improve uniformity in discharge properties. Further, the average particle diameter may be 5 μm or more and 30 μm or less, or more preferably in some embodiments, for example, 10 μm or more and 30 μm or less. The average particle diameter of the roughness forming particle 18 is expressed by a mean of any 20 points obtained by observing the surface of the surface layer 16 with a laser microscope and taking, as the particle diameter, the diameter of the roughness forming particle 18 visible upon surface observation.

The roughness forming particle 18 may be composed of one type of particles or may be composed of two or more types of particles. The expression "one type of particles" refers to, firstly, particles of the same material. "The same material" means that, among polymer-made particles, for example, those included in the polyurethane may be said to be the same in a broad sense, and those having the same monomer composition may be said to be the same in a narrow sense. Preferably, those having the same monomer composition may be taken as the same in the narrow sense in some embodiments, for example. Moreover, the expression "one type of particles" refers to, secondly, particles having the same particle diameter. "Having the same particle diameter" means that the particle diameter is uniform. For example, for any 50 positions, the diameter of the roughness forming particle 18 is measured, a mean thereof is taken as μ, a deviation thereof is taken as σ, and μ/σ is 4.97 or less. The diameter of the roughness forming particle 18 may be measured by observing the diameter of the particle using a laser microscope (e.g., "VK-9510" manufactured by Keyence).

The roughness forming particle 18 may be composed of one type of particles. If the roughness forming particle 18 is composed of two or more types of particles having different materials or particle diameters, it becomes necessary to adjust the thickness of the binder polymer 16a covering the roughness forming particle 18 in further consideration of the difference in the effects on discharge properties resulting from the materials or particle diameters of the roughness forming particles 18. If the roughness forming particle 18 is composed of one type of particles in terms of the material and particle diameter, it is easy to adjust the thickness of the binder polymer 16a covering the roughness forming particle 18. Thus, uniformity in discharge properties can be improved. In addition, in the case where two types of particles with significantly different particle diameters are included, the particles with different sizes are likely to aggregate, and dispersibility is likely to deteriorate. If the roughness forming particle 18 is composed of one type of particles in terms of the particle diameter, since aggregation of the roughness forming particles 18 can be easily controlled, uniformity in surface roughness can be improved. Further, if the roughness forming particle 18 is composed of one type of particles in terms of the particle diameter, since the asperity configuration of the elastic body layer 14 is easily reflected in the surface asperities of the charging roll, it is easy to control the surface asperities of the charging roll.

In the surface layer 16, the thickness of the binder polymer 16a is set to a predetermined thickness. A thickness t1 of the binder polymer 16a covering the roughness forming particle 18 on the groove 22 is set to be greater than a thickness t2 of the binder polymer 16a covering the roughness forming particle 18 on the plane part 24. Accordingly, a discharge amount on the roughness forming particle 18 on the groove 22 and a discharge amount on the roughness forming particle 18 on the plane part 24 are adjusted to be the same, and uniformity in discharge properties can be improved. Thus, generation of a black dot image can be suppressed. This is because the portion provided with the roughness forming particle 18 on the plane part 24 is inferior to the portion provided with the roughness forming particle 18 on the groove 22 in terms of the discharge amount due to contact with the photoconductor, and to make the discharge amount the same at each position, it is required to reduce the film thickness of the portion provided with the roughness forming particle 18 on the plane part 24 to be less than the film thickness of the portion provided with the roughness forming particle 18 on the groove 22 to increase the capacitance and increase the charge amount on the surface.

A difference (t1−t2) between the thickness t1 of the binder polymer 16a covering the roughness forming particle 18 on the groove 22 and the thickness t2 of the binder polymer 16a covering the roughness forming particle 18 on the plane part 24 may be 4 μm or more and 16 μm or less. If the thickness difference (t1−t2) is 4 μm or more, the charge amount on the surface of the binder polymer 16a covering the roughness forming particle 18 on the plane part 24 becomes relatively large, and a range of environment in which a black dot image is not generated is widened. Considering the above, the thickness difference (t1−t2) may be 5 μm or more, or more preferably in some embodiments, for example, 6 μm or more. Further, if the thickness difference (t1−t2) is 16 μm or less, since the thickness is maintained at an appropriate level, suitable asperities are easily formed. Thus, uniformity in discharge properties can be improved. Considering the above, the thickness difference (t1−t2) may be 15 μm or less, or more preferably in some embodiments, for example, 12 μm or less.

The thickness t1 of the binder polymer 16a covering the roughness forming particle 18 on the groove 22 may be 5 μm or more and 20 μm or less. If the thickness t1 is 5 μm or more, the resistance at discharge spots is likely to be uniform, and discharge properties are likely to be uniform. Considering the above, the thickness t1 may be 6 μm or more, or more preferably in some embodiments, for example, 7 μm or more. If the thickness t1 is 20 μm or less, an appropriate roughness is ensured on the surface of the surface layer 16 on the groove 22, and a discharge region can be secured. Considering the above, the thickness t1 may be 18 μm or less, or more preferably in some embodiments, for example, 15 μm or less.

The thickness t2 of the binder polymer 16a covering the roughness forming particle 18 on the plane part 24 may be 1.0 μm or more and 4.0 μm or less. If the thickness t2 is 1.0 μm or more, the resistance at discharge spots is likely to be uniform, and discharge properties are likely to be uniform. Considering the above, the thickness t2 may be 1.5 μm or more, or more preferably in some embodiments, for example, 2.0 μm or more. If the thickness t2 is 4.0 μm or less, an appropriate roughness is ensured on the surface of the surface layer 16, and a discharge region can be ensured. Considering the above, the thickness t2 may be 3.5 μm or less, or more preferably in some embodiments, for example, 3.0 μm or less.

The thicknesses t1 and t2 of the binder polymer 16a may be measured by observing a cross section using a laser microscope (e.g., "VK-9510" manufactured by Keyence). For example, for any five positions of the binder polymer 16a covering the roughness forming particle 18 on the groove 22, the thickness of the binder polymer 16a may be measured, and t1 may be represented by a mean thereof. Further, for any five positions of the binder polymer 16a covering the roughness forming particle 18 on the plane part 24, the thickness of the binder polymer 16a may be measured, and t2 may be represented by a mean thereof.

To increase the thickness t1 of the binder polymer 16a covering the roughness forming particle 18 on the groove 22 to be greater than the thickness t2 of the binder polymer 16a covering the roughness forming particle 18 on the plane part 24, both surface energy instability of the roughness forming particle 18 on the groove 22 and energy instability of the base rubber of the groove 22 may be utilized. That is, it is possible to exploit the fact that the roughness forming particle 18 on the grooves 22 tends to stabilize by covering with a large amount of the binder polymer 16a, and that the base rubber of the groove 22 tends to stabilize by covering with a large amount of the binder polymer 16a.

Although the content of the roughness forming particle 18 in the surface layer 16 is not particularly limited, to improve the dispersibility of the roughness forming particles 18 and easily ensure uniform charging properties, the content of the roughness forming particle 18 may be 3 parts by mass or more and 50 parts by mass or less with respect to 100 parts by mass of the binder polymer 16a of the surface layer 16. Preferably, the content of the roughness forming particle 18 may be 5 parts by mass or more and 30 parts by mass or less in some embodiments, for example.

A conductive agent may be added to the surface layer 16 to impart conductivity. Examples of the conductive agent may include an electronic conductive agent and an ionic conductive agent. Examples of the electronic conductive agent may include carbon black, graphite, and conductive metal oxide. Examples of the conductive metal oxide may include conductive titanium oxide, conductive zinc oxide, conductive tin oxide, etc. Examples of the ionic conductive agent may include quaternary ammonium salt, borate, a surfactant, etc. Various additives may be appropriately added to the surface layer 16 as required. Examples of the additives may include a plasticizer, a leveling agent, a filler, a vulcanization accelerator, a processing aid, a mold release agent, etc.

The volume resistivity of the surface layer 16 may be set to a semi-conductive region considering the charging properties and the like. Specifically, for example, the volume resistivity of the surface layer 16 may be set within a range of $1.0 \times 10^7$ to $1.0 \times 10^{10}$ Ω·cm. The volume resistivity may be measured according to JIS K6911.

The elastic body layer 14 may be formed as follows, for example. First, the shaft 12 is coaxially arranged in a hollow part of a roll molding die. An uncrosslinked conductive rubber composition is injected, heated, and cured (crosslinked), and then mold release is performed; alternatively, an uncrosslinked conductive rubber composition is extruded onto the surface of the shaft 12, to thereby form the elastic body layer 14 on the outer circumference of the shaft 12.

Examples of the method for forming the grooves 22 on the outer peripheral surface of the elastic body layer 14 may include polishing and molding. In either method, regular grooves 22 may be formed on the outer peripheral surface of the elastic body layer 14. In the case of polishing, for example, while rotating a roll body provided with the elastic body layer 14 about an axis center at a constant speed, by moving a grindstone in contact with the outer peripheral surface of the elastic body layer 14 at a constant speed in one axial direction, grooves 22 that regularly define spirals along the axial direction can be formed on the outer peripheral surface of the elastic body layer 14. Further, for example, after moving the grindstone in the one axial direction, by moving in the other axial direction, grooves 22 in a mesh pattern in which grooves 22a that regularly define right-handed spirals along the axial direction and grooves 22b that regularly define left-handed spirals along the axial direction intersect with each other can be formed on the outer peripheral surface of the elastic body layer 14.

The surface layer 16 may be formed by using a material for forming the surface layer 16, applying the material to the outer peripheral surface of the elastic body layer 14, and performing a drying treatment or the like as appropriate. The material forming the surface layer 16 may contain a diluent solvent. Examples of the diluent solvent may include a ketone solvent such as methyl ethyl ketone (MEK) and methyl isobutyl ketone, an alcohol solvent such as isopropyl alcohol (IPA), methanol, and ethanol, a hydrocarbon solvent such as hexane and toluene, an acetic acid solvent such as ethyl acetate and butyl acetate, an ether solvent such as diethyl ether and tetrahydrofuran, water, etc.

According to the charging roll 10 configured as described above, the grooves 22 which regularly define spirals along the axial direction are formed on the outer peripheral surface of the elastic body layer 14. With the groove width w and the groove depth d of the groove 22 and the area ratio a/b of the bottom surface 221 of the groove 22 and the plane part 24 being within specific ranges, the roughness forming particles 18 can be uniformly arranged in a well-balanced manner on both the plane part 24 and the groove 22 of the elastic body layer 14. Also, desired surface roughnesses can be formed, and a desired roughness difference between the plane part 24 and the groove 22 of the elastic body layer 14 can be formed to adjust to an appropriate discharge amount. Furthermore, by configuring the thickness of the binder polymer 16a covering the roughness forming particle 18 on the groove 22 to be greater than the thickness of the binder polymer 16a covering the roughness forming particle 18 on the plane part 24, the discharge amount can be made uniform. Thus, the uniformity in discharge properties is excellent.

In the charging roll 10 according to the disclosure, instead of forming the surface asperities on the charging roll by arranging two types of roughness forming particles of different sizes on the outer peripheral surface of an elastic body layer that is planar as a whole, surface asperities are formed on the charging roll 10 by forming a predetermined asperity configuration on the outer peripheral surface of the elastic body layer 14 and arranging the relatively uniform roughness forming particles 18 having a predetermined size thereon. The roughness forming particles 18 are arranged not only on the groove 22 of the elastic body layer 14 but also on the plane part 24. Thus, the step difference of the surface asperities of the elastic body layer 14 appears as the surface asperities of the charging roll 10. If the roughness forming particles 18 are relatively uniform, the surface asperities of the elastic body layer 14 are likely to be reflected on the surface of the charging roll 10. To arrange the roughness forming particle 18 not only on the groove 22 of the elastic body layer 14 but also on the plane part 24, the groove width w of the groove 22 may not be too large or too small with respect to the size of the roughness forming particle 18. With the groove width w of the groove 22 being a predetermined size, the roughness forming particle 18 can be reliably and uniformly arranged not only on the groove 22 but also on the plane part 24. Similarly, the width of the plane part 24 may not be too large or too small. To arrange the roughness forming particle 18 reliably and uniformly on the plane part 24 as well, a predetermined area ratio may be adopted. In the disclosure, a predetermined asperity configuration is formed on the outer peripheral surface of the elastic body layer 14, so the surface area of the outer peripheral surface of the elastic body layer can be increased compared to the outer peripheral surface of an elastic body layer that is planar as a whole. Thus, discharge becomes easier. This effect is exhibited even if the grooves 22 of the elastic body layer 14 are filled with the binder polymer 16a of the surface layer 16, for example. This effect is an unprecedented finding. From this point of view as well, the configuration of the disclosure is advantageous.

Although the embodiment of the disclosure has been described above, the disclosure is not limited to the above embodiment, and various modifications may be made without departing from the spirit of the disclosure.

Figure 4:
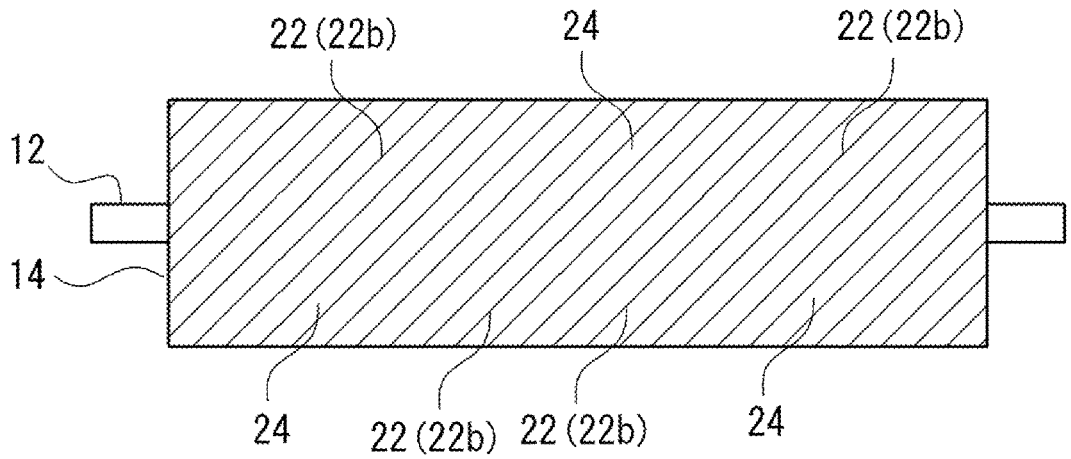
FIG. 4 is a schematic external view of the elastic body layer showing a modification example of the pattern of the grooves formed on the outer peripheral surface of the elastic body layer.

For example, in the above embodiment, the grooves 22 in a mesh pattern in which the groove 22a that regularly define right-handed spirals along the axial direction and the grooves 22b that regularly define left-handed spirals along the axial direction intersect with each other are formed on the outer peripheral surface of the elastic body layer 14. However, the grooves 22 formed on the outer peripheral surface of the elastic body layer 14 may be either the grooves 22a defining right-handed spirals or the grooves 22b defining left-handed spirals. For example, as shown in FIG. 4, the grooves 22 may have only the grooves 22b defining left-handed spirals. The grooves 22 in a mesh pattern are more advantageous than either case in terms of uniformity in roughness.

EXAMPLES

The disclosure will be described in detail below with reference to Examples and Comparative Examples.

Example 1

<Preparation of Conductive Rubber Composition>

With respect to 100 parts by mass of isoprene rubber, 30 parts by mass of carbon black, 6 parts by mass of zinc oxide, 2 parts by mass of stearic acid, 1 part by mass of sulfur, 0.5 parts by mass of a thiazole-based vulcanization accelerator, 0.5 parts by mass of a thiuram-based vulcanization accelerator, and 50 parts by mass of heavy calcium carbonate were added, and the components were kneaded for 10 minutes using a closed mixer controlled at 50° C. to prepare a conductive rubber composition.

The following materials were prepared as materials for the conductive rubber composition.

Isoprene rubber (IR): "JSR IR2200" manufactured by JSR
Carbon black: "Shoblack N762" manufactured by Cabot Japan
Zinc oxide: "Zinc oxide #2" manufactured by Sakai Chemical Industry Co., Ltd.
Stearic acid: "Stearic acid Sakura" manufactured by NOF
Sulfur: "Powdered sulfur" manufactured by Tsurumi Chemical Industry Thiazole-based vulcanization accelerator: "Nocceler DM" manufactured by Ouchi Shinko Chemical Industrial Thiuram-based vulcanization accelerator: "Nocceler TRA" manufactured by Ouchi Shinko Chemical Industrial Heavy calcium carbonate: "Whiton B" manufactured by Shiraishi Calcium, average particle diameter 3.6 μm <Production of Elastic Body Layer>

A core bar (diameter 8 mm) was set in a molding die (pipe shape), the above composition was injected and heated at 180° C. for 30 minutes, and then cooling and demolding were performed to form an elastic body layer composed of a conductive rubber elastic body with a thickness of 1.9 mm on the outer circumference of the core bar. Next, while rotating the roll body provided with the elastic body layer about an axis center at a constant speed, a grindstone in contact with the outer peripheral surface of the elastic body layer was moved at a constant speed in one axial direction, and then the grindstone in contact with the outer peripheral surface of the elastic body layer was moved at a constant speed in the other axial direction. Thus, as shown in FIG. 2, grooves in a mesh pattern in which grooves that regularly define right-handed spirals along the axial direction and grooves that regularly define left-handed spirals along the axial direction intersect with each other were formed on the outer peripheral surface of the elastic body layer. The conditions were as follows.

Rotational speed of roll body: 500 rpm
Movement speed of grindstone: 0.05 m/s
Peripheral speed of grindstone: 72 m/s
Grain size of grindstone: #1500
Groove pitch: 0.3 mm <Preparation of Surface Layer>

A roughness forming particle, a binder polymer, and carbon black as a conductive agent were added according to the formulation compositions (parts by mass) shown in the table, 200 parts by mass of methyl ethyl ketone (MEK) was added, and the components were mixed and stirred at a predetermined stirring speed to prepare a liquid composition for forming the surface layer. Next, while continuing stirring, the liquid composition was roll-coated on the outer peripheral surface of the elastic body layer and heat-treated to form a surface layer having a thickness of 1.0 μm on the outer circumference of the elastic body layer. Thus, a charging roll of Example 1 was produced.

Example 2

<Preparation of Conductive Rubber Composition>

With respect to 100 parts by mass of NBR, 0.7 parts by mass of stearic acid, 5 parts by mass of zinc oxide, 2 parts by mass of hydrotalcite, 3 parts by mass of a peroxide crosslinking agent, and 20 parts by mass of carbon were added, and these components were stirred and mixed with a stirrer to prepare a conductive rubber composition.

The following materials were prepared as materials for the conductive rubber composition.

NBR: "Nipol 1041" manufactured by Nippon Zeon
Stearic acid: "Stearic acid Sakura" manufactured by NOF
Zinc oxide: "Zinc oxide #2" manufactured by Sakai Chemical Industry Co., Ltd.
Hydrotalcite: "DHT4A" manufactured by Kyowa Chemical Industry Co., Ltd.
Peroxide crosslinking agent: "Percumyl D40" manufactured by NOF
Carbon: "Ketjen Black EC300J" manufactured by Ketjen Black International <Production of Elastic Body Layer>

With the heating temperature changed to 170° C., similar to Example 1, an elastic body layer composed of a conductive rubber elastic body was formed. Next, similar to Example 1, grooves in a mesh pattern were formed on the outer peripheral surface of the elastic body layer by polishing.

<Production of Surface Layer>

Similar to Example 1, a surface layer having a thickness of 1.0 μm was formed on the outer circumference of the elastic body layer. Thus, a charging roll of Example 2 was produced.

Example 3

<Preparation of Conductive Rubber Composition>

With respect to 100 parts by mass of hydrin rubber, 5 parts by mass of a vulcanization aid, 10 parts by mass of carbon, 0.5 parts by mass of a vulcanization accelerator, 2 parts by mass of sulfur, and 50 parts by mass of a filler were added, and these components were stirred and mixed with a stirrer to prepare a conductive rubber composition.

The following materials were prepared as materials for the conductive rubber composition.

Hydrin rubber (ECO, "Hydrin H1100" manufactured by Nippon Zeon)
Vulcanization aid (zinc oxide, "Zinc oxide #2" manufactured by Mitsui Kinzoku)
Carbon ("Ketjen Black EC300J" manufactured by Ketjen Black International)
Vulcanization accelerator (2-mercaptobenzothiazole, "Nocceler M-P" manufactured by Ouchi Shinko Chemical Industrial)
Sulfur ("Sulfax PTC" manufactured by Tsurumi Chemical Industry)
Filler (calcium carbonate, "Hakuenka CC" manufactured by Shiraishi Kogyo)

<Production of Elastic Body Layer>

Similar to Example 1, an elastic body layer composed of a conductive rubber elastic material was formed. Next, similar to Example 1, grooves in a mesh pattern were formed on the outer peripheral surface of the elastic body layer by polishing.

<Preparation of Surface Layer>

Similar to Example 1, a surface layer having a thickness of 1.0 μm was formed on the outer circumference of the elastic body layer. Thus, a charging roll of Example 3 was produced.

Examples 4, 5, 7, and 8

With the surface layer materials changed, charging rolls of Examples 4, 5, 7, and 8 were produced in a manner similar to Example 3.

Example 6

As shown in FIG. 4, grooves that regularly define left-handed spirals along the axial direction were formed on the outer peripheral surface of the elastic body layer, and a charging roll of Example 6 was produced in a manner similar to Example 3.

Comparative Examples 1 to 8

With the surface layer materials changed, charging rolls of Comparative Examples 1 to 8 were produced in a manner similar to Example 3.

The materials used as the surface layer materials were as follows.

Binder polymer (PA): "Fine Resin FR-101" manufactured by Namariichi

Binder polymer (PU): "ART Resin UN-333" manufactured by Negami Chemical Industrial Roughness forming particle (PU<1>): "Art Pearl TK-100TR" manufactured by Negami Chemical Industrial, average particle diameter 2 μm Roughness forming particle (PU<2>): "Art Pearl C-1000 transparent" manufactured by Negami Chemical Industrial, average particle diameter 3 μm Roughness forming particle (PU<3>): "Art Pearl C-300 transparent" manufactured by Negami Chemical Industrial, average particle diameter 22 μm Roughness forming particle (PU<4>): "Art Pearl C-200 transparent, classified product" manufactured by Negami Chemical Industrial, average particle diameter 32 μm Roughness forming particle (PU<5>): "Art Pearl C-200 transparent, classified product" manufactured by Negami Chemical Industrial, average particle diameter 35 μm Roughness forming particle (PA): "TR-2" manufactured by Toray, average particle diameter 22 μm Roughness forming particle (PMMA): "Art Pearl GR-200 transparent" manufactured by Negami Chemical Industrial, average particle diameter 22 μm Carbon black: "Seast 9H" manufactured by Tokai Carbon Surface analysis and cross-sectional analysis of the polished elastic body layer of the charging roll were performed, and the groove width of the groove, the groove depth of the groove, and the area ratio a/b between the area a of the bottom surface of the groove and the area b of the plane part were calculated. Further, the surface roughness Rz and the thickness of the binder polymer of the surface layer were measured for the produced charging roll.

(Asperity Configuration of Elastic Body Layer)

The groove width of the groove was calculated based on a mean of groove widths at 100 points of any grooves observed in photographed images obtained by photographing the outer peripheral surface of the elastic body layer with a laser microscope. The groove depth of the groove was calculated based on a mean of groove depths at 100 points of any grooves observed in photographed images obtained by photographing the radial cross section of the elastic body layer with a laser microscope. The area ratio a/b between the area a of the bottom surface of the groove and the area b of the plane part was obtained by photographing any five positions on the outer peripheral surface of the elastic body layer with a laser microscope, calculating the area a of the bottom surface of the groove and the area b of the plane part observed in a predetermined range (0.1 mm×0.1 mm) of the photographed images, and calculating a mean of the ratios.

(Surface Roughness Rz)

The surface roughness Rz was a 10-point mean roughness, and was a mean value of values measured at any five positions in accordance with JIS B0601 (1994). The surface roughness Rz of the entire surface layer was measured based on observation using a laser microscope ("VK-9510" manufactured by Keyence). In images photographed at 400 times magnification, a value calculated in the surface roughness mode of an analysis program (program name: KEYENCE VK Analyzer analysis application) was taken as the surface roughness Rz of the entire surface layer. The surface roughness Rz of the surface layer in the region on the groove was measured based on observation using a laser microscope ("VK-9510" manufactured by Keyence). In photographed images, a value calculated by selecting a groove of 0.01 mm$^2$ in the surface roughness mode of an analysis program (program name: KEYENCE VK Analyzer analysis application) was taken as the surface roughness Rz of the groove.

(Binder Thickness)

The binder thickness was measured by observing the radial cross section of the surface layer at 400 times magnification using a laser microscope ("VK-X100" manufactured by Keyence). As shown in FIG. 2, the thickness (binder thickness t1) of the binder polymer covering the roughness forming particle on the groove, and the thickness (binder thickness t2) of the binder polymer covering the roughness forming particle on the plane part were measured. The thicknesses were respectively measured at any 5 positions and were respectively represented by a mean thereof.

(Image Evaluation: Unevenness)

The produced charging roll was attached to a unit (black) of an actual machine ("MP C6004" manufactured by RICOH), images were produced at a 25% density halftone in an environment of 10° C. and 10% RH, and evaluation was performed after running 500,000 sheets. A sample with no unevenness in the image was rated as good "o", and a sample with unevenness in the image was rated as poor "x".

(Image Evaluation: Horizontal Stripe)

The produced charging roll was attached to a unit (black) of an actual machine ("MP C6004" manufactured by RICOH), images were produced at a 25% density halftone in an environment of 10° C. and 10% RH, and evaluation was performed after running 500,000 sheets. A sample with no horizontal stripes in the image was rated as particularly good "o", and a sample with horizontal stripes in the image and greatly affecting the image was rated as poor "x".

(Image Evaluation: Set Stripe)

The produced charging roll was attached to a unit (black) of an actual machine ("MP C6004" manufactured by RICOH) and left in an environment of 50° C. and 95% RH for one week. Afterwards, with the charging roll being attached to the unit (black) of the actual machine ("MP C6004" manufactured by RICOH), images were produced at a 25% density halftone in an environment of 10° C. and 10% RH. A sample with no set stripes in the image was rated as particularly good "o", and a sample with set stripes in the image and greatly affecting the image was rated as poor "x".

(Image Evaluation: Black Dots (Fogging))

The produced charging roll was attached to a unit (black) of an actual machine ("MP C6004" manufactured by RICOH), images were produced at a 25% density halftone in an environment of 10° C. and 10% RH, and evaluation was performed after running 500,000 sheets. A sample with no black dots in the image was rated as good "o", and a sample with even one black dot found in the image was rated as poor "x".

TABLE 1

| | | Example | | | | | | | |
|---|---|---|---|---|---|---|---|---|---|
| | | 1 | 2 | 3 | 4 | 5 | 6 | 7 | 8 |
| Elastic body layer | Polymer material | IR | NBR | ECO | ECO | ECO | ECO | ECO | ECO |
| | Groove width (μm) | 4 | 80 | 80 | 80 | 280 | 80 | 80 | 80 |
| | Groove depth (μm) | 2 | 30 | 15 | 15 | 15 | 15 | 15 | 15 |
| | Area ratio (groove bottom surface/plane part) | 1.0 | 1.0 | 0.3 | 2.4 | 1.0 | 1.0 | 1.0 | 1.0 |
| | Asperity configuration | Mesh | Mesh | Mesh | Mesh | Mesh | Spiral | Mesh | Mesh |
| Surface layer | Binder material | PA | PU | PA | PU | PU | PU | PU | PU |
| | Binder amount (part by mass) | 100 | 100 | 100 | 100 | 100 | 100 | 100 | 100 |
| | Particle material | PU | PU | PA | PU | PMMA | PU | PU | PU |
| | Particle amount (part by mass) | 3 | 25 | 25 | 25 | 50 | 25 | 25 | 25 |
| | Number average particle diameter (μm) | 3 | 32 | 22 | 22 | 22 | 22 | 22 | 22 |
| | Carbon black | 50 | 50 | 50 | 50 | 50 | 50 | 50 | 50 |
| | Roughness Rz: entirety (μm) | 5 | 26 | 16 | 16 | 16 | 16 | 16 | 16 |
| | Roughness Rz: groove (μm) | 2 | 16 | 10 | 10 | 10 | 10 | 10 | 10 |
| | Binder thickness: on plane part particle (μm) | 2.5 | 1.0 | 2.5 | 2.5 | 4.0 | 2.5 | 0.8 | 4.4 |
| | Binder thickness: on groove particle (μm) | 10 | 5 | 10 | 10 | 20 | 10 | 4 | 23 |
| Image evaluation | Unevenness after running long period of time | ○ | ○ | ○ | ○ | ○ | ○ | ○ | ○ |
| | Horizontal stripe after running long period of time | ○ | ○ | ○ | ○ | ○ | ○ | ○ | ○ |
| | Set stripe | ○ | ○ | ○ | ○ | ○ | ○ | ○ | ○ |
| | Black dots (fogging) after running long period of time | ○ | ○ | ○ | ○ | ○ | ○ | ○ | ○ |

TABLE 2

| | | Comparative Example | | | | | | | |
|---|---|---|---|---|---|---|---|---|---|
| | | 1 | 2 | 3 | 4 | 5 | 6 | 7 | 8 |
| Elastic body layer | Polymer material | ECO | ECO | ECO | ECO | ECO | ECO | ECO | ECO |
| | Groove width (μm) | 3 | 310 | 80 | 80 | 80 | 80 | 80 | 80 |
| | Groove depth (μm) | 15 | 15 | 1 | 34 | 15 | 15 | 2 | 30 |
| | Area ratio (groove bottom surface/plane part) | 1.0 | 1.0 | 1.0 | 1.0 | 0.2 | 2.5 | 1.0 | 1.0 |
| | Asperity configuration | Mesh | Mesh | Mesh | Mesh | Mesh | Mesh | Mesh | Mesh |
| Surface layer | Binder material | PU | PU | PU | PU | PU | PU | PU | PU |
| | Binder amount (part by mass) | 100 | 100 | 100 | 100 | 100 | 100 | 100 | 100 |
| | Particle material | PU | PU | PU | PU | PU | PU | PU | PU |
| | Particle amount (part by mass) | 25 | 25 | 25 | 25 | 25 | 25 | 25 | 25 |
| | Number average particle diameter (μm) | 3 | 22 | 3 | 32 | 22 | 22 | 2 | 35 |
| | Carbon black | 50 | 50 | 50 | 50 | 50 | 50 | 50 | 50 |
| | Roughness Rz: entirety (μm) | 5 | 16 | 26 | 26 | 16 | 16 | 3 | 29 |
| | Roughness Rz: groove (μm) | 4 | 10 | 26 | 1 | 10 | 0 | 2 | 27 |
| | Binder thickness: on plane part particle (μm) | 2.5 | 2.5 | 2.5 | 2.5 | 2.5 | 2.5 | 2.5 | 2.5 |
| | Binder thickness: on groove particle (μm) | 10 | 10 | 10 | 10 | 10 | 10 | 10 | 10 |
| Image evaluation | Unevenness after running long period of time | ○ | X | ○ | ○ | X | X | ○ | ○ |
| | Horizontal stripe after running long period of time | X | ○ | X | ○ | ○ | ○ | X | ○ |
| | Set stripe | ○ | ○ | ○ | ○ | ○ | ○ | ○ | ○ |
| | Black dots (fogging) after running long period of time | ○ | ○ | ○ | X | ○ | ○ | ○ | X |

In Comparative Example 1, the groove width was too small, and the roughness forming particle did not enter the groove. Thus, the difference between the surface roughness defined by the roughness forming particle on the plane part and the surface roughness defined by the roughness forming particle on the groove was small, and horizontal stripes were generated due to insufficient charging. If a roughness forming particle having a size that fits in the small groove width is used, a roughness that ensures sufficient discharge cannot be formed. In Comparative Example 2, the groove width was too large, and the roughness forming particle could not be uniformly arranged in the grooves. Thus, unevenness occurred after running over a long period of time. If a roughness forming particle having a size suitable for the large groove width is used, the protrusion defined by the roughness forming particle becomes too large, the surface roughness becomes too large, and an appropriate surface roughness cannot be obtained. Thus, uniform discharge properties cannot be obtained. In addition, in Comparative Example 2, the groove width was too large, and the binder polymer covering the roughness forming particle on the groove easily came into contact with the photoconductor. Thus, wearing occurred not only in the binder polymer covering the roughness forming particle on the plane part and the roughness forming particle thereunder, but wearing also occurred in the binder polymer covering the roughness forming particle on the groove and the roughness forming particle thereunder. The entire surface of the surface layer was worn upon running over a long period of time, and unevenness was generated in the image.

In Comparative Example 3, the groove depth was too small, the difference between the surface roughness defined by the roughness forming particle on the plane part and the surface roughness defined by the roughness forming particle on the groove was small, and horizontal stripes were generated due to insufficient charging. If a small roughness forming particle is used in accordance with the small groove depth, a roughness that ensures sufficient discharge cannot be formed. In Comparative Example 4, the groove depth was too large, and a surface roughness could not be formed on the groove by the roughness forming particle arranged in the groove. Thus, black dots (fogging) were generated in the image after running over a long period of time. If a large roughness forming particle is used in accordance with the large groove depth, the difference between the surface roughness defined by the roughness forming particle on the plane part and the surface roughness defined by the roughness forming particle on the groove becomes too large, and discharge becomes difficult.

In Comparative Examples 5 and 6, the area ratio a/b between the area a of the bottom surface of the groove and the area b of the plane part was not within the predetermined range, and the ratio of either one was too large. Thus, the uniformity in the surface asperity was deteriorated, and an uneven image was generated after running over a long period of time.

In Comparative Example 7, the surface roughness Rz of the entire surface layer was too small, and a roughness that ensures sufficient discharge could not be formed. Thus, horizontal stripes were generated due to insufficient charging. In Comparative Example 8, the surface roughness Rz of the entire surface layer and the surface roughness Rz of the surface layer in the region on the groove were too large, and discharge becomes difficult. Thus, black dots (fogging) were generated in the image after running over long period of time.

On the other hand, in Examples, grooves that regularly define spirals along the axial direction are formed on the outer peripheral surface of the elastic body layer. The groove width and the groove depth of the groove and the area ratio a/b between the bottom surface of the groove and the plane part are within specific ranges. The surface layer includes the binder polymer and the roughness forming particle. The roughness forming particle is arranged on the plane part and on the groove of the elastic body layer, respectively. The surface roughness Rz of the surface layer in the region on the groove and the surface roughness Rz of the entire surface layer are within specific ranges. The thickness of the binder polymer covering the roughness forming particle on the groove is greater than the thickness of the binder polymer covering the roughness forming particle on the plane part. Thus, in image evaluation, it was learned that unevenness, horizontal stripes, and black dots (fogging) after running over a long period of time were suppressed in Examples, and uniformity in discharge properties was excellent in Examples. Moreover, set stripes were not generated in the image, and no peeling of the surface layer was observed after running over a long period of time.

Although the embodiments and examples of the disclosure have been described above, the disclosure is not limited to the embodiments and examples described above, and various modifications may be made without departing from the spirit of the disclosure.

What is claimed is:

1. A charging roll for an electrophotographic apparatus, comprising:
   a shaft;
   an elastic body layer formed on an outer peripheral surface of the shaft; and
   a surface layer formed on an outer peripheral surface of the elastic body layer, wherein
   grooves which regularly define spirals along an axial direction are formed on the outer peripheral surface of the elastic body layer,
   a groove width of the groove is 4 µm or more and 280 µm or less,
   a groove depth of the groove is 2 µm or more and 30 µm or less,
   on the outer peripheral surface of the elastic body layer, an area ratio a/b between an area a of a bottom surface of the groove and an area b of a plane part, which is a portion other than the groove, is 0.3 or more and 2.4 or less,
   the surface layer comprises a binder polymer and a roughness forming particle,
   the roughness forming particle is arranged on the plane part and on the groove of the elastic body layer, respectively,
   a surface roughness Rz of the surface layer in a region on the groove is 2 µm or more and 16 µm or less,
   a surface roughness Rz of the entire surface layer is 5 µm or more and 26 µm or less, and
   a thickness of the binder polymer covering the roughness forming particle on the groove is greater than a thickness of the binder polymer covering the roughness forming particle on the plane part.

2. The charging roll for an electrophotographic apparatus according to claim 1, wherein the roughness forming particle is composed of one type of particle.

3. The charging roll for an electrophotographic apparatus according to claim 1, wherein the roughness forming particle is formed of a material comprising at least one of polyurethane, polyamide, and acrylic resin.

4. The charging roll for an electrophotographic apparatus according to claim 1, wherein the roughness forming particle has an average particle diameter of 3 μm or more and 32 μm or less.

5. The charging roll for an electrophotographic apparatus according to claim 1, wherein a difference between the thickness of the binder polymer covering the roughness forming particle on the plane part and the thickness of the binder polymer covering the roughness forming particle on the groove is 4 μm or more and 16 μm or less.

6. The charging roll for an electrophotographic apparatus according to claim 1, wherein the elastic body layer comprises at least one of isoprene rubber, nitrile rubber, and hydrin rubber.

7. The charging roll for an electrophotographic apparatus according to claim 1, wherein the binder polymer of the surface layer comprises at least one of polyurethane and polyamide.

8. The charging roll for an electrophotographic apparatus according to claim 1, wherein the grooves in a mesh pattern in which grooves are that regularly define right-handed spirals along the axial direction and grooves that regularly define left-handed spirals along the axial direction intersect with each other are formed on the outer peripheral surface of the elastic body layer.

* * * * *